United States Patent [19]

Kaneko et al.

[11] Patent Number: 4,745,494
[45] Date of Patent: May 17, 1988

[54] SYSTEM FOR CORRECTING TIME BASE ERROR OF INFORMATION REPRODUCING APPARATUS

[75] Inventors: Atsushi Kaneko, Kamakura; Junichi Ikoma; Akio Nakashima, both of Yokohama, all of Japan

[73] Assignees: Hitachi Video Eng. Inc.; Hitachi, Ltd., both of Tokyo, Japan

[21] Appl. No.: 872,904

[22] Filed: Jun. 11, 1986

[30] Foreign Application Priority Data

Jun. 12, 1985 [JP] Japan .................................. 60-126082
Jun. 17, 1985 [JP] Japan .................................. 60-129762

[51] Int. Cl.$^4$ .............................................. H04N 5/95
[52] U.S. Cl. ...................................... 358/338; 358/342
[58] Field of Search ............... 358/320, 321, 322, 324, 358/325, 326, 337, 338, 339, 342; 360/36.1, 36.2

[56] References Cited

U.S. PATENT DOCUMENTS 4,053,926 10/1977 Lemoine et al. ..................... 358/325
4,208,674 6/1980 Kuniyoshi et al. .................. 358/326
4,415,935 11/1983 Suzuki .................................. 358/320
4,609,948 9/1986 Okano ................................. 358/338

FOREIGN PATENT DOCUMENTS 2086089 6/1982 United Kingdom ............... 358/322

Primary Examiner—Donald McElheny, Jr.
Attorney, Agent, or Firm—Antonelli, Terry & Wands

[57] ABSTRACT

A light emitted from a laser diode is reflected by a video disc which is rotated by a spindle motor. The reflected light is modulated by video information recorded on the video disc and converted to an electrical signal by a photodiode array. A signal generated by a trapezoidal generator is sampled with a horizontal synchronizing signal separated from the video information signal. The sampled signal is supplied to the spindle motor for correcting a time base error. A zero crossing point of the trapezoidal waveform is detected and is utilized for controlling the start of a rise portion of the trapezoidal waveform for compensating a DC offset. The trapezoidal waveform is controlled so as to vary an average power supplied to the spindle motor in accordance with a detected rotational speed difference so as to compensate a rotational speed of the spindle motor.

23 Claims, 7 Drawing Sheets

FIG. 3A REF. SIG.
FIG. 3B TRAPE. WAVE
FIG. 3C S/H SIG.
FIG. 3D JITTER ERROR

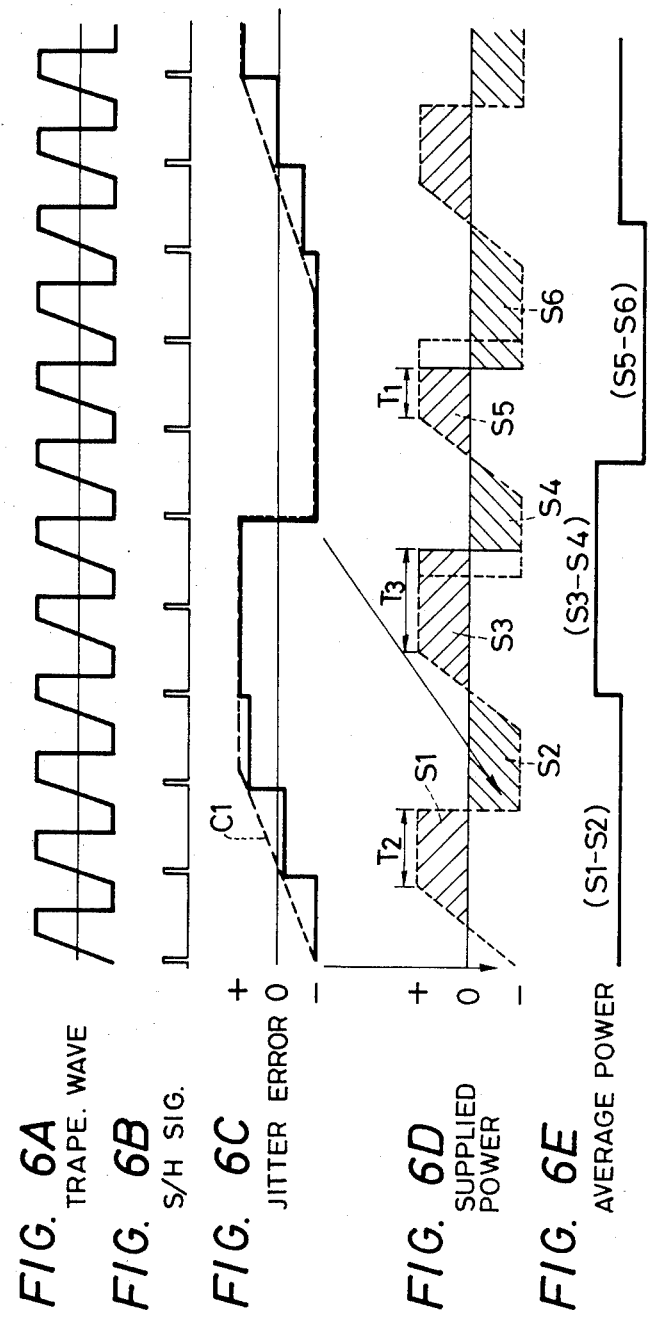

SYSTEM FOR CORRECTING TIME BASE ERROR OF INFORMATION REPRODUCING APPARATUS

BACKGROUND OF THE INVENTION

The present invention relates to a system for correcting a time base error of an information reproducing apparatus, especially of a video disc player.

In an information reproducing apparatus, for example, a video disc player, several servo systems are used for obtaining reproducing information for reproducing high quality pictures, for example. A first servo system is an auto focus servo system which drives an object lens for focusing a light beam emitted from a laser light source onto a disc surface of a video disc. A second servo system is a tracking tracking servo system which moves the object lens in a radial direction of the disc for maintaining a focused light spot to impinge on an information track recorded on the video disc. A third servo system is a time base correcting system which is a so called jitter servo system. An example of the jitter servo system is shown in FIG. 11 and described in U.S. Pat. No. 4,371,899. The jitter servo system controls a rotational speed of a spindle motor rotating the disc, or moves the object lens in a tangential direction of the track for reproducing the information recorded on the disc surface in synchronism with a prescribed synchronizing signal.

It is known and described in U.S. Pat. No. 4,415,935 to use a trapezoidal waveform signal for correcting a phase difference between the reproduced signal and a reference signal. However, this patent does not take into considerations the fluctuation of a DC offset included in the phase difference error signals.

Additionally, in the prior arrangements, the control of the phase difference and the control of the rotational speed of the spindle motor has been effected by independent control systems, respectively.

SUMMARY OF THE INVENTION

An object of the present invention is to provide an improved system for correcting a time base error eliminating an influence of the fluctuation of the DC offset.

Another object of the present invention is to provide an improved system which is capable of controlling both of the phase difference and the rotational speed of the spindle motor.

A further object of the present invention is to provide an improved system which controls a start timing of a ramp waveform signal in response to a variation of a zero crossing point of the inclinating waveform.

A still further object of the present invention is to provide an improved system which controls a reset timing of a ramp waveform signal on the basis of a rotational speed difference signal.

DESCRIPTION OF THE PREFERRED EMBODIMENT

Figure 1:
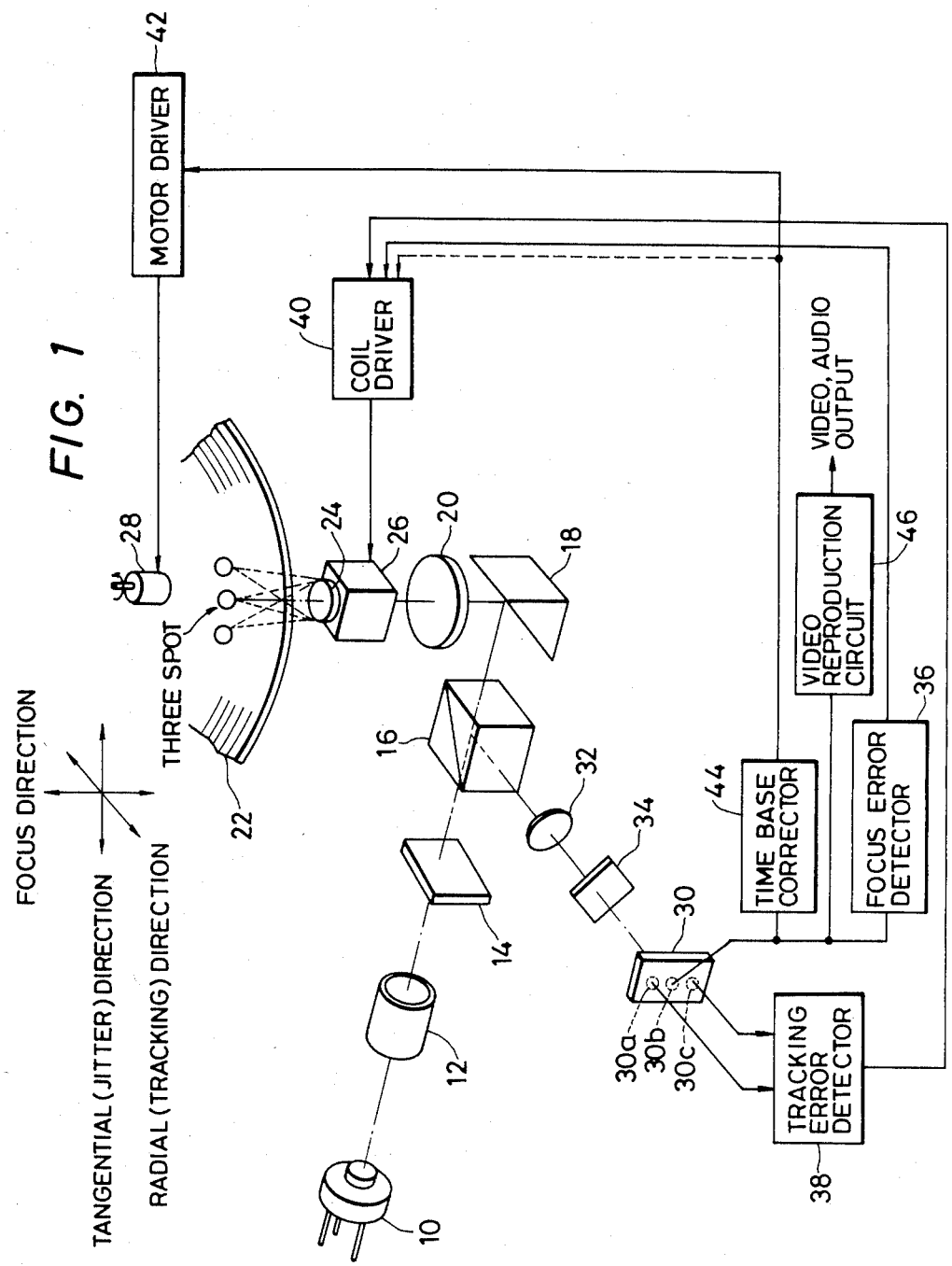
FIG. 1 illustrates a block diagram of principal parts of the present invention.

FIG. 1 shows a block diagram of principal parts of an optical video player. Referring to FIG. 1, a light beam emitted from a laser diode 10 is collimated by a collimator lens 12 and split into three beams via a diffracting grating 14 for forming three separated light spots on a disc 22. The two beams forming light spots on both sides of a center light spot are used for tracking error detection and the center beam forming the center light spot is used for focus error detection, time base error detection and reproducing signal detection.

The beams passing through a deflection beam splitter 16 are reflected by a triangular reflecting mirror 18 and converted into circular deflection beams via a ¼ wavelength plate 20, and deflected on a tangential direction and a radial direction of a track of the disc 22 by an object lens 24 installed in a three-dimensional actuator 26. The disc 22, which is an information recording medium, is rotated by a spindle motor 28 at a rotational speed of, for example, 1,800 r.p.m. for a CAV (Constant Angular Velocity) disc or at a rotational speed of, for example, between 1,800 r.p.m. and 600 r.p.m. for a CLV (Constant Linear Velocity) disc. The beams are modulated by the pits formed on the disc 22, are reflected by a reflecting surface of the disc, and the rotational direction of the circular deflection of the beams are reversed. The refelcted beams are picked up by the object lens 24, and passed through the ¼ wavelength plate 20. The reflected beams are converted to linear deflection light with a direction which crosses the incident beam at right angles, are reflected by the mirror 18 and reflected by the deflection beam splitter 16 and reach a photodiode array 30 through a lens 32 and a cylindrical lens 34. The cylindrical lens 34 is required for the detection of a focus error signal.

The beams reflected by the disc 22 and then reflected by the beam splitter 16 pass through the cylindrical lens 34 and are applied to the light receiving surface of the photodiode array 30. When the disc 22 is too far or too near to the focusing position of the object lens 24, an oval light spot is applied to the light receiving surface of the photodiode array 30b, and the focus error voltage can be detected by a focus error detector 36. The center photodiode array 30b which is split into four parts serves for the detection of a focus error signal.

At the same time, the ± dimensional ligt split by the grating 14 focuses as slightly separated spots from the center light spot on the same track via the object lens 24, and the respective reflected light beams from both sides of the center light spot is detected by the signal photodiode arrays 30a and 30c. The track position is detected by the difference between the respective reflected light beams and the tracking error voltage is detected by a tracking error detector 38.

The focus error signal and the tracking error signal are respectively applied to a coil driver 40. The coil driver 40 applies a control current to respective coils of the three-dimensional actuator and controls the position of the object lens 24 in the radial direction of the track on the disc 22 and the vertical direction to the disc 22.

A time base corrector 44 detects a time base error signal (jitter error signal) from an FM signal produced form the center photodiode array 30b. The time base error signal is applied to a motor driver 42 and the coil driver 40. The object lens 24 is driven in the tangential direction of the track for correcting a time base error. The rotational speed and the rotational phase of the spindle motor 28 is controlled for correcting the time base error.

The output signal from the center photodiode array 30b is applied to a video reproduction circuit 46 to be converted into a video signal.

Figure 2:
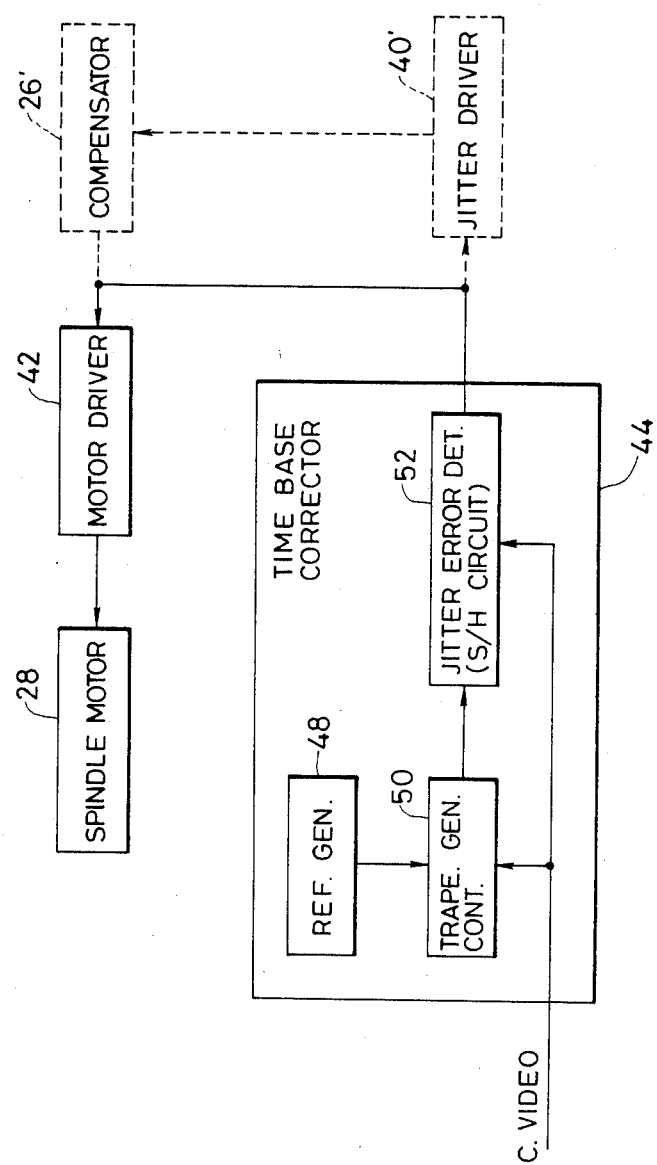
FIG. 2 illustrates a block diagram of major parts of the present invention.

As shown in FIG. 2, the time base corrector 44 comprises a reference generator 48, a trapezoidal waveform signal generating controller 50 and a jitter error detector 52. The trapezoidal generating controller 50 generates a trapezoidal signal. However in place of a trapezoidal waveform generator including in the trapezoidal generating controller, a generator which generates ramp waveform signals can also be used. The waveform of the trapezoidal waveform signals generated from the trapezoidal waveform signal generating controller 50 is controlled by the reference generator 48. The trapezoidal signal generated from the trapezoidal generating controller 50 and a composite video signal, which is reproduced from the video disc via the photodiode array 30b, are supplied to the jitter error detector 52. The jitter error detector 52 samples the trapezoidal waveform signal in accordance with a horizontal synchronizing signal included in the composite video signal, and holds and produces the jitter error signal (the time base error signal).

The jitter error signal detected by the jitter error detector 52 is supplied to the motor driver 42 for the spindle motor 28, and controls the rotational phase and the rotational speed of the spindle motor 28. The motor driver 42 determines the polarity of the input signal, and outputs an error signal by inserting the minus polarity signal. The error signal is compared with a sawtooth waveform signal and then pulse signals varying the width of it is generated. The spindle motor 28 is driven by a power driver which is switched on-off by the pulse signals. Furthermore, the jitter error signal is supplied not only to the spindle motor 28 but also to a compensator 26' via a jitter driver 40'. The compensator 26' is used additionally for correcting the phase difference. Even if there is no compensator 26', the phase difference between the detected signal and the reference signal and the rotational speed of the spindle motor can be corrected by the control of the spindle motor. However, the additional use of the compensator 26' is effective for improving a frequency response in a range of a high frequency. A three-dimensional actuator 2 for driving the object lens 24 is one example of a compensator 26'. The three-dimensional actuator 26 can be driven in three directions for three kinds of servo systems as described above, i.e., the focus servo system, the tracking servo system and the jitter servo system. The jitter error signal is converted to a driving signal for the compensator 26' by the jitter driver 40', and the converted signal is supplied to a jitter coil of the actuator 26. As the compensator 26', a tangential mirror driven mechanically, or a charge coupled device (CCD) varying a delay degree of signal electrically can also be used. The current flowing in the jitter coil can be supplied to the motor driver 42 as a motor error signal.

Before describing the principal of correction of the DC offset, the principal of phase difference detection is described below with the present invention utiizing a type of a phase detector which samples the trapezoidal signal with a horizontal synchronizing signal and detects the phase difference based on the sampled value.

Figure 3:
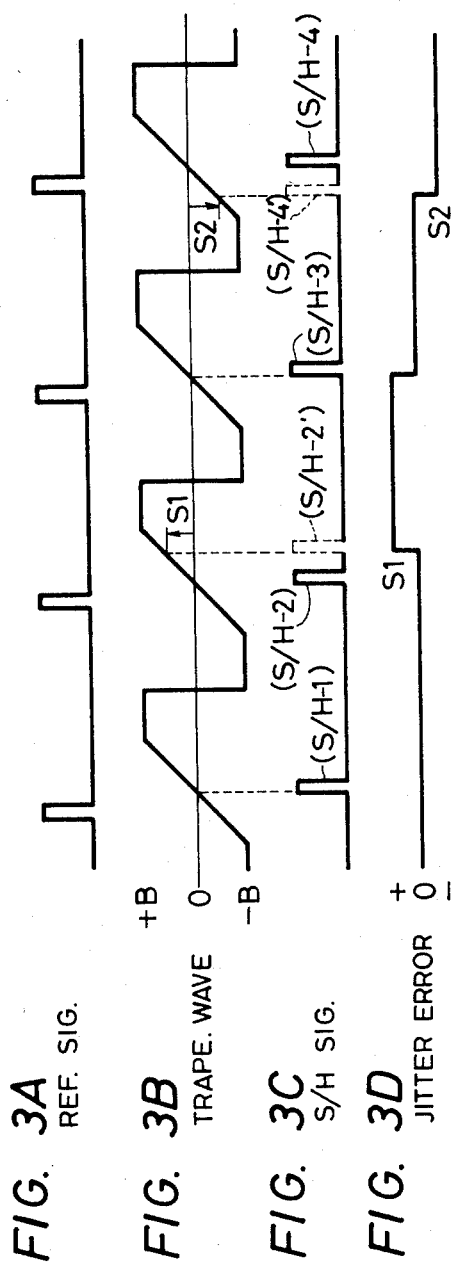
FIGS. 3A-3D illustrate time charts explaining a principal of control of the present invention.

FIGS. 3A-3D show waveforms at various points in the circuitry shown hereinafter. FIG. 3A represents waveforms of reference signal produced from a reference frequency source such as the reference generator 48 in FIG. 2. The reference signal indicate the reference of the rotational speed of the disc, and has a predetermined period. The abscissa of Fig.3A-3D represents time and the ordinate represents voltage. FIG. 3B shows the trapezoidal waveform signal and FIG. 3C shows a sample holding signal which is the horizontal synchronizing signal which is separated from composite video signal. The period of the reference signal in FIG. 3A which shows the reference of the rotational speed of the disc is substantially the same as the period of the sample holding signal (FIG. 3C), and the disc rotates under a locked condition in which the rotational speed of the disc is substantially the same as a predetermined rotational speed. Under the locked condition, as there is no period difference between the period of the reference signal (FIG. 3A) and the period of the sample holding signal (FIG. 3C), the sampled voltage which is obtained by sampling the trapezoidal waveform signal (FIG. 3B) with the sample holding signal (FIG. 3C) is zero. That is, the voltage sampled with the sample and hold pulses (S/H-1), (S/H-2) is zero as shown in FIG. 3D when there is no phase difference. However, in case the relative phase of the horizontal synchronizing signal (FIG. 3C) to the reference signal (FIG. 3A) varies as shown by the broken line the pulse (S/-2') in FIG. 3C, the sampled voltage becomes S1 as shown in FIG. 3D. By the sampled voltage S1, the variation of the relative phase difference can be detected. In case that the phase of the sample holding signal of FIG. 3C advances with respect to the reference pluse of FIG. 3A as shown by the broken line pulse (S/H-4'), the sampled voltage takes a minus value as shown in FIG. 3D. Therefore, the variation of the relative phase difference can be corrected by controlling the spindle motor of the disc by the sampled voltage (the jitter error).

The principal of correction of the phase variation based on the fluctuation of the DC offset of the tangential servo (the jitter servo) signal which occurs when the controlling subject for the tangential servo is driven with DC current is set forth below. As an example of the fluctuation of the DC offset of the tangential servo, the fluctuation of the ramp waveform signal of the trapezoidal waveform signal is considered.

Figure 4:
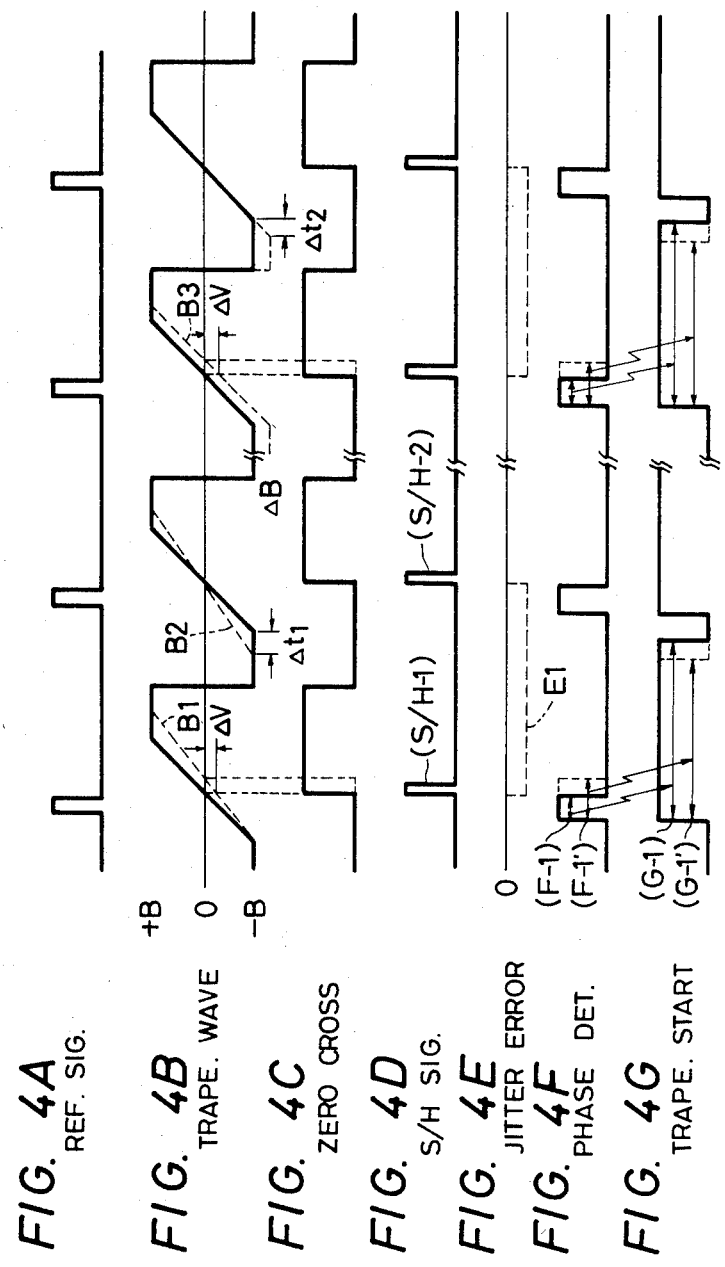
FIGS. 4A-4G illustrate time charts explaining a principal of a control of a phase difference of a preferred embodiment of the present invention.

FIGS. 4A-4G show waveforms at various points in the circuitry shown hereinafter. The abscissa of FIGS. 4A-4D represents time and the ordinate represents voltage. FIG. 4A shows a reference signal produced from a reference frequency source, FIG. 4B shows a trapezoidal waveform signal, and FIG. 4D shows a sampling holding signal which is a horizontal synchronizing signal separated from a composite video signal. The trapezoidal waveform signal shown by solid line in FIG. 4B represent a case of no DC offset, and the broken line B1 or B3 in FIG. 4B show a trapezoidal waveform signal in case of DC offset. If the DC offset is not present, the jitter error voltage as shown in FIG. 4E sampled by the sample holding signal of FIG. 4D is zero. However, when the slope of the ramp of the trapezoidal waveform varies as a result of the capacitance change of a condenser used for generating the trapezoidal waveform signal, which variation is shown by broken line B1 in FIG. 4B, an offset voltage ΔV is generated at the leading edge of the sample/hold pulse (S/H-1). Therefore a jitter error E1 is generated by the offset voltage ΔV even though there is no difference in phase between the reproduced signal and the reference signal. Therefore, when the offset voltage is produced, the start timing of the ramp portion the trapezoidal waveform is controlled to eliminate the offset voltage. As shown in FIG. 4C, zero crossing points of the trapezoidal waveform are detected by a zero crossing detector. The leading edge of a zero crossing pulse of FIG. 4C is compared in phase with the leading edge of the reference pulse of FIG. 4A as shown in FIG. 4F, then the start timing of the trapezoidal waveform as shown in FIG. 4G is controlled by the pulse width of the phase compared pulse as shown in FIG. 4F. As shown in FIG. 4F, when the pulse width of the phase compared pulse becomes F-1', which is longer than the normal pulse width F-1 when the DC offset does not exist, the pulse width of a trapezoidal start pulse becomes G-1', which is shorter than the normal pulse width G-1, and the start timing of the inclination of the trapezoidal waveform is advanced a time of Δt1. As the result of the start timing control described above, the start timing of the inclination advances the time of Δt1, the trapezoidal waveform generated has a waveform as shown by broken line B2 in FIG. 4B, and the jitter error voltage as shown in FIG. 4E sampled and held by the horizontal synchronizing signal (S/H-2) becomes zero.

In another example, when the voltage of the reference power source for the trapezoidal waveform generation changes from −B to −(B+ΔB), a DC offset voltage ΔB generates as shown by the broken line B3 in FIG. 4B. For this offset voltage ΔB, the phase compensation can be effected by detecting the zero crossing point of the trapezoidal waveform, and comparing the phase between the zero crossing pulse and the reference pulse, and then advancing the start timing of the ramp portion of the trapezoidal waveform at the time of Δt2.

Figure 5:
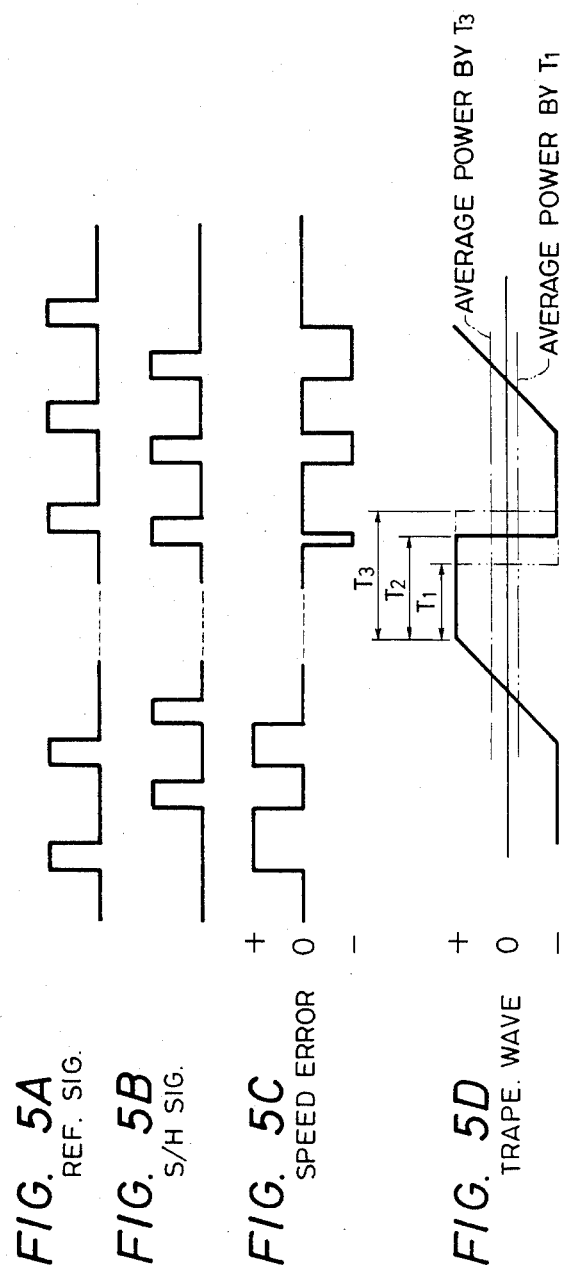
FIGS. 5A-5D illustrate time charts explaining a principal of a control of a rotational speed of a preferred embodiment of the present invention.

The principal of rotational speed detecting will be described using FIGS. 5A–5D. An unlocked condition exists between the reference signal of FIG. 5A and the sample holding signal of FIG. 5B. The abscissa represents time and the ordinate represents voltage. At the beginning in time, at the left side of the figure, the phase of the reference signal of FIG. 5A is advanced with respect to that of the sample holding signal of FIG. 5B, the phase of both signals closes, and at right side of the figure the phase of the reference signal FIG. 5A lags with respect to that of the sample holding signal of FIG. 5B. As to a rotational speed difference signal of FIG. 5C, if the pulse signal which has a positive polarity in case that the reference signal of FIG. 5A is advanced with respect to the sample holding signal of FIG. 5B and a negative polarity for an opposite condition and has a pulse width indicating the degree of advance or delay of the rotational speed is obtained.

A method for controlling a driving motor of the disc so as to compensate the rotational speed difference, by using the rotational speed difference signal of FIG. 5C is now described. The time length of the upper side of the trapezoidal waveform of FIG. 5D is varied depending on the polarity and the pulse width of the speed difference signal. Namely, if the sample holding signal of FIG. 5B lags with respect to the reference signal, the time length T becomes longer corresponding to the degree of advance by controlling a generating circuit of the trapezoidal waveform signal.

Figure 6:
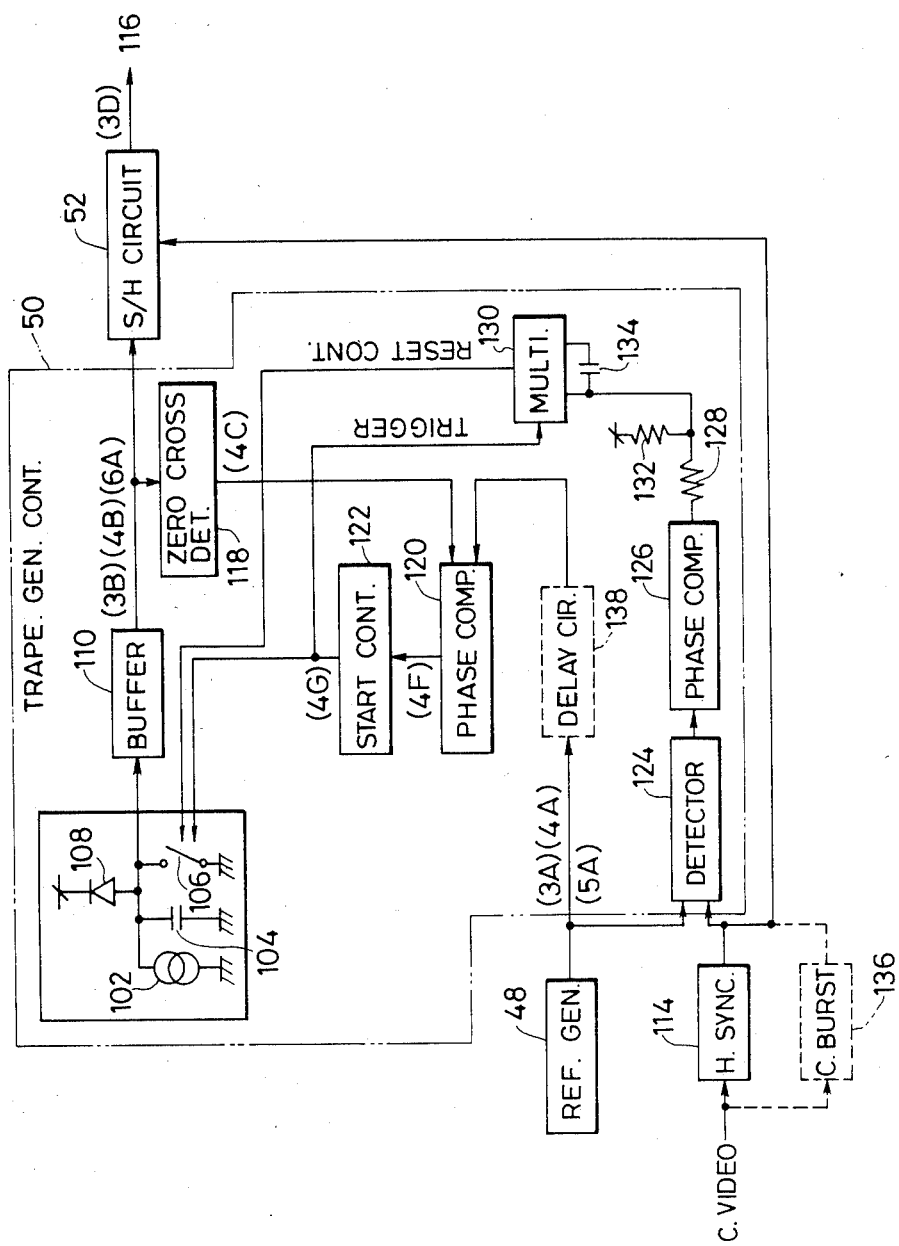
FIG. 6 illustrates a block diagram of principal parts of a preferred embodiment of the present invention.

FIG. 6 illustrates a block diagram of apparatus for correcting the phase and the rotational speed in the manner described above. In FIG. 6, a trapezoidal waveform generator consist of a constant current source 102, a condenser 104, a switch 106 and a diode 108. When the switch 106 is in the off condition, the condenser 104 is charged with the constant current generated from the constant current source 102, a voltage between two electrodes of the condenser 104 increases to +B V which is determined by a source voltage connected to the diode 108. After turning the switch 106 on, the electric charge being charged in the condenser 104 begins to discharge through the switch 106 until the voltage reaches -B V. The trapezoidal waveform signal is formed as described above, and supplied to a buffer 110 for converting an impedance, and the output of the buffer 110 is supplied to the sample/hold circuit 52. From the composite video signal, the horizontal synchronizing signal is separated by a horizontal synchronizing circuit 114, supplies to the sample/hold circuit 52.

Under the locked condition of the rotational phase, the voltage as of the detected output from an output terminal 116 represents the jitter error signal (FIG. 3D) by sample/holding the instantaneous voltage of the ramp of the trapezoidal waveform, the phase of which is fit to the phase of the sample/holding signal (FIG. 3C).

A zero crossing detetor 118 detects the zero crossing point of the ramp of the trapezoidal waveform, and the output of it supplied to one of input of a phase comparator 120. To another input terminal of the phase comparator 120, the reference signal (FIG. 4A) is applied, which is generated from the reference generator 48. The phase comparator 120 outputs the phase difference signal between the two inputs signals and connects to a start controlling circuit 122. The start controlling circuit 122 supplies signal (FIG. 4F) to the switch 106 for controlling the start timing of the portion of the ramp of the trapezoidal waveform (FIG. 4B) by turning the switch 106 off.

A delay circuit 138 which gives a constant delay time for the reference pulse can also be used, if the phase difference between pulse inputting to the phase comparator 120 is large in normal condition, since the phase comparison between signals having a large phase difference is more difficult than a small one.

The reference signal (FIG. 5A) from the reference frequency source 48 is applied to one of the input terminals of a detector 124 as a type of an edge controlled digital memory. The detector 124 detects the difference of the phase and frequency between two inputs. To another input terminal, the horizontal synchronizing signal is applied as the sample holding signal. The horizontal synchronizing signal which is reproduced from the disc and separated from the composite video signal by a horizontal synchronizing circuit 114 is supplied. The output of the detector 124 is input to a phase compensating circuit 126 which includes an integrating factor. The output terminal of the circuit 126 is connected via a resistor 128 to a node of a resistor 132 and a condenser 134 for the multivibrator 130.

The condenser 134 and the resistor 132 are elements for determining a time constant of the multivibrator 130, which are connected to a power source. The output of the one-shot multivibrator 130 is supplied to the switch 106, and the switch 106 will be turned on for resetting the trapezoidal waveform in response to the output of the multivibrator 130.

In place of the horizontal synchronizing circuit 114, a color burst signal circuit 136 which separates color burst signal from the composite video signal can be used. A phase inverting edge of the color burst signal is stable compared with the horizontal synchronizing signal, the color burst signal has an advantage for compensating the error.

Instead of varying the time length of the upper side of the trapezoidal waveform of FIG. 5D, the following method can also be used for compensating the rotational speed difference. This method controls a voltage during a period of the upper side of the trapezoidal waveform in response to the rotational speed difference signal. Since the phase compensator 126 of FIG. 6 includes the integrating factor, an integrated signal of speed error signal of FIG. 5C is applied to the input terminal of the buffer 110 via a switch circuit. The reference generator 48 is connected to a second reference generator. The second generator generates a pulse signal which is synchronized with the reference signal of FIG. 5A and has a high level during a period corresponding to the period of the upper side of the trapezoidal waveform of FIG. 5D. The period of the high level of the pulse is constant. The pulse signal generated from the second reference generator controls the switch circuit so as to apply the output of the phase compensator 126 during the period of the upper side of the trapezoidal waveform. The voltage in a period of the upper side of the trapezoidal waveform varies depending on the rotational speed difference. The variation of the voltage varies the average power supplied to the spindle motor, and the rotational speed difference can be compensated.

It should be noted that while several embodiments in accordance with the present invention have been described above, the present invention is not limited thereto and is susceptible of numerous changes and modifications as known to those skilled in the art with the present invention being encompassed by the scope of the appended claims.

We claim:

1. A system for correcting a time base error of an information reproducing apparatus, comprising:
   means for reproducing an information signal from an information recording medium;
   means for separating a periodical signal from said information signal reproduced by said reproducing means;
   means for generating a ramp signal;
   means for sampling said ramp signal generated by said generating means with said periodical signal separated by said separating means; and
   time base error correcting means for correcting a time base error which is caused by fluctuation of said information signal reproduced by said reproducing means based on said sampled signal by said sampling means, said time base error correcting means including zero crossing means for detecting zero crossing points of said ramp signal generated by said generating means, and ramp signal controlling means for controlling a start of a rise portion of said ramp signal in response to said zero crossing points detected by said zero crossing means.

2. The system according to claim 1, further comprising a motor driving said information recording medium, said time base error correcting means controlling a rotational phase of said motor by said sampled signal.

3. The system according to claim 2, wherein said time base error signal correcting means further comprises compensator means for correcting a component of a high frequency in said time base error.

4. The system according to claim 1, wherein said ramp signal is a trapezoidal signal.

5. The system according to claim 1, wherein said information signal is a composite video signal, and said periodical signal separated by said separating means is a horizontal video signal.

6. The system according to claim 1, wherein said information signal is a composite video signal, and said periodical signal separated by said separating means is a color burst signal.

7. The system according to claim 1, wherein said ramp signal controlling means compares a phase between a signal indicative of said zero crossing points and a reference periodical signal which is generated from a reference generator so as to detect a phase difference, said ramp signal controlling means controlling the start of the rise portion of said ramp signal based on said phase difference detected.

8. The system according to claim 7, wherein said ramp signal controlling means further comprises a delay circuit which delays a phase of said reference periodical signal, said ramp signal controlling means comparing said delayed reference periodical signal with said signal indicative of said zero crossing points.

9. A system for correcting a time base error of an information reproducing apparatus, comprising:
   means for reproducing an information signal from an information recording medium;
   means for separating a periodical signal from said information signal reproduced by said reproducing means;
   means for generating a ramp signal;
   means for sampling said ramp signal generated by said generating means with said periodical signal separated by said separating means;
   means for driving said information recording medium in response to said ramp signal; and
   time base error correcting means for correcting a time base error which is caused by fluctuation of said information signal reproduced by said reproducing means based on said sampled signal by said sampling means, said time base error correcting means including rotational speed means for detecting a rotational speed difference between a reference rotational speed and an actual rotational speed of a motor used in said driving means, and power control means for controlling said ramp signal generating means so as to vary an average power supplied to said driving means.

10. The system according to claim 9, wherein said power control means controls resetting of said ramp signal based on said rotational speed difference signal detected by said rotational speed detecting means so as to vary said average power supplied to said driving means.

11. The system according to claim 9, wherein said ramp signal is a trapezoidal signal, and said power control means controls a voltage during a period of a positive voltage portion of said ramp signal based on said rotational speed difference signal detected by said rotational speed detecting means.

12. The system according to claim 9, wherein said ramp signal is a trapezoidal signal.

13. The system according to claim 9, wherein said information signal is a composite video signal, and said periodical signals separated by said separating means is a horizontal video signal.

14. The system according to claim 9, wherein said information signal is a composite video signal, and said periodical signal separated by said separating means is a color burst signal.

15. A system for correcting a time base error of an information reproducing apparatus, comprising:
- means for reproducing an information signal from an information recording medium;
- means for separating a periodical signal from said information signal reproduced by said reproducing means;
- means for generating a ramp signal;
- means for sampling said ramp signal generated by said generating means with said periodical signal separated by said separating means;
- means for driving said information recording means in response to said ramp signal; and
- time base error correcting means for correcting a time base error which is caused by fluctuation of said information signal reproduced by said reproducing means based on said sampled signal by said sampling means, said time base error correcting means including zero crossing means for detecting zero crossing points of said ramp signal, means for controlling a start of a rise portion of said ramp signal in response to said zero crossing points detected by said zero crossing detecting means, rotational speed means for detecting a rotational speed difference between a reference rotational speed and an actual rotational speed of a motor used in said driving means, and power control means for controlling said ramp signal generating means so as to vary an average power supplied to said driving means.

16. The system according to claim 15, wherein said power control means controls a resetting of said ramp signal based on said rotational speed difference signal detected by said rotational speed difference detecting means so as to vary said average power supplied to said driving means.

17. The system according to claim 15, wherein said ramp signal is a trapezoidal signal, and said power control means controls a voltage during a period of a positive voltage portion of said ramp signal based on said rotational speed difference signal detected by said rotational speed detecting means.

18. The system according to claim 15, wherein said time base error correcting means controls a rotational phase of said motor used in said driving means by said sampled signal.

19. The system according to claim 15, wherein said ramp signal is a trapezoidal signal.

20. The system according to claim 15, wherein said information signal is a composite video signal, and said periodical signal separated by said separating means is a horizontal video signal.

21. The system according to claim 15, wherein said information signal is a composite video signal, and said periodical signal separated by said separating means is a color burst signal.

22. The system according to claim 15, wherein said ramp signal control means for controlling the start of the rise portion of said ramp signal includes phase comparison means for comparing a phase between a signal indicative of said zero crossing points and a reference periodical signal which is generated from a reference generator so as to detect a phase difference, said ramp signal control means controlling the start of the rise portion of said ramp signal based on said phase difference detected.

23. The system according to claim 22, wherein said ramp signal control means further comprises a delay circuit which delays a phase of said reference periodical signal, said phase comparison means comparing said delayed reference periodical signal with said signal indicative of said zero crossing points.

* * * * *

UNITED STATES PATENT AND TRADEMARK OFFICE
CERTIFICATE OF CORRECTION

PATENT NO. : 4,745,494

DATED : May 17, 1988

INVENTOR(S) : Atsushi Kaneko, et al.

It is certified that error appears in the above-identified patent and that said Letters Patent is hereby corrected as shown below:

Columns 7 and 8 should be added as shown on the attached page.

Signed and Sealed this

Fourteenth Day of November, 1989

Attest:

JEFFREY M. SAMUELS

Attesting Officer     Acting Commissioner of Patents and Trademarks switch 106, and the switch 106 will be turned on for resetting the trapezoidal waveform in response to the output of the multivibrator 130.

In place of the horizontal synchronizing circuit 114, a color burst signal circuit 136 which separates color burst signal from the composite video signal can be used. A phase inverting edge of the color burst signal is stable compared with the horizontal synchronizing signal, the color burst signal has an advantage for compensating the error.

Instead of varying the time length of the upper side of the trapezoidal waveform of FIG. 5D, the following method can also be used for compensating the rotational speed difference. This method controls a voltage during a period of the upper side of the trapezoidal waveform in response to the rotational speed difference signal. Since the phase compensator 126 of FIG. 6 includes the integrating factor, an integrated signal of speed error signal of FIG. 5C is applied to the input terminal of the buffer 110 via a switch circuit. The reference generator 48 is connected to a second reference generator. The second generator generates a pulse signal which is synchronized with the reference signal of FIG. 5A and has a high level during a period corresponding to the period of the upper side of the trapezoidal waveform of FIG. 5D. The period of the high level of the pulse is constant. The pulse signal generated from the second reference generator controls the switch circuit so as to apply the output of the phase compensator 126 during the period of the upper side of the trapezoidal waveform. The voltage in a period of the upper side of the trapezoidal waveform varies depending on the rotational speed difference. The variation of the voltage varies the average power supplied to the spindle motor, and the rotational speed difference can be compensated.

It should be noted that while several embodiments in accordance with the present invention have been described above, the present invention is not limited thereto and is susceptible of numerous changes and modifications as known to those skilled in the art with the present invention being encompassed by the scope of the appended claims.

We claim:

1. A system for correcting a time base error of an information reproducing apparatus, comprising:
   means for reproducing an information signal from an information recording medium;
   means for separating a periodical signal from said information signal reproduced by said reproducing means;
   means for generating a ramp signal;
   means for sampling said ramp signal generated by said generating means with said periodical signal separated by said separating means; and
   time base error correcting means for correcting a time base error which is caused by fluctuation of said information signal reproduced by said reproducing means based on said sampled signal by said sampling means, said time base error correcting means including zero crossing means for detecting zero crossing points of said ramp signal generated by said generating means, and ramp signal controlling means for controlling a start of a rise portion of said ramp signal in response to said zero crossing points detected by said zero crossing means.

2. The system according to claim 1, further comprising a motor driving said information recording medium, said time base error correcting means controlling a rotational phase of said motor by said sampled signal.

3. The system according to claim 2, wherein said time base error signal correcting means further comprises compensator means for correcting a component of a high frequency in said time base error.

4. The system according to claim 1, wherein said ramp signal is a trapezoidal signal.

5. The system according to claim 1, wherein said information signal is a composite video signal, and said periodical signal separated by said separating means is a horizontal video signal.

6. The system according to claim 1, wherein said information signal is a composite video signal, and said periodical signal separated by said separating means is a color burst signal.

7. The system according to claim 1, wherein said ramp signal controlling means compares a phase between a signal indicative of said zero crossing points and a reference periodical signal which is generated from a reference generator so as to detect a phase difference, said ramp signal controlling means controlling the start of the rise portion of said ramp signal based on said phase difference detected.

8. The system according to claim 7, wherein said ramp signal controlling means further comprises a delay circuit which delays a phase of said reference periodical signal, said ramp signal controlling means comparing said delayed reference periodical signal with said signal indicative of said zero crossing points.

9. A system for correcting a time base error of an information reproducing apparatus, comprising:
   means for reproducing an information signal from an information recording medium;
   means for separating a periodical signal from said information signal reproduced by said reproducing means;
   means for generating a ramp signal;
   means for sampling said ramp signal generated by said generating means with said periodical signal separated by said separating means;
   means for driving said information recording medium in response to said ramp signal; and
   time base error correcting means for correcting a time base error which is caused by fluctuation of said information signal reproduced by said reproducing means based on said sampled signal by said sampling means, said time base error correcting means including rotational speed means for detecting a rotational speed difference between a reference rotational speed and an actual rotational speed of a motor used in said driving means, and power control means for controlling said ramp signal generating means so as to vary an average power supplied to said driving means.

10. The system according to claim 9, wherein said power control means controls resetting of said ramp signal based on said rotational speed difference signal detected by said rotational speed detecting means so as to vary said average power supplied to said driving means.

11. The system according to claim 9, wherein said ramp signal is a trapezoidal signal, and said power control means controls a voltage during a period of a positive voltage portion of said ramp signal based on said rotational speed difference signal detected by said rotational speed detecting means.